UNITED STATES PATENT OFFICE.

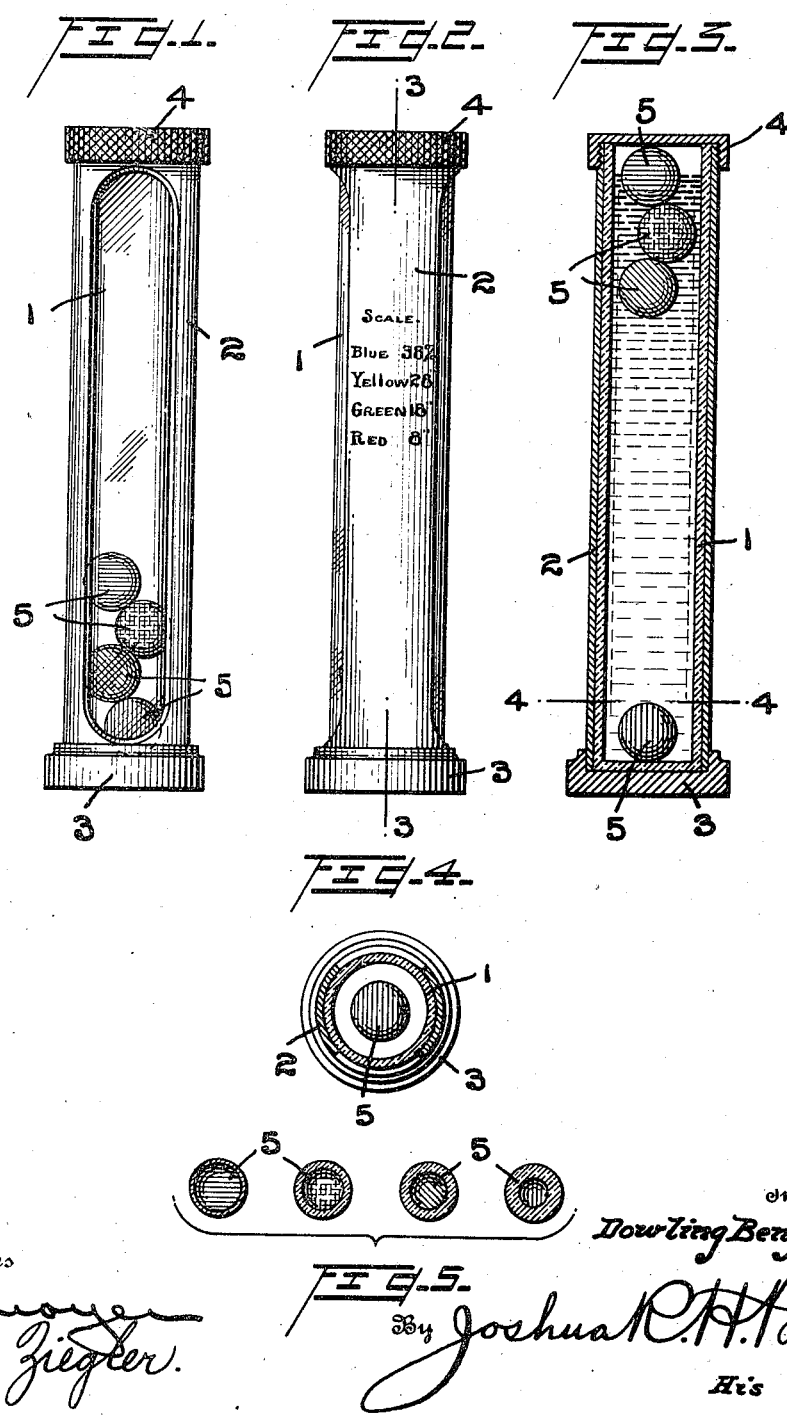

DOWLING BENJAMIN, OF CAMDEN, NEW JERSEY.

COMPOUND DENSITY AND FREEZING-POINT INDICATOR.

1,159,889.  Specification of Letters Patent.  Patented Nov. 9, 1915.

Application filed January 16, 1915. Serial No. 2,508.

*To all whom it may concern:*

Be it known that I, DOWLING BENJAMIN, a citizen of the United States, residing at Camden, in the county of Camden and State of New Jersey, have invented certain new and useful Improvements in Compound Density and Freezing-Point Indicators, of which the following is a specification.

My invention relates to improvements in compound density and freezing point indicators, the object of the invention being to provide a measuring instrument which will show at a glance the density of liquid and enable the user to ascertain the freezing point of the liquid under test.

My improved device is especially adapted for use by automobile owners, enabling them to determine the percentage of alcohol in the water of the radiators.

It is a common practice to mix alcohol with the water in automobile radiators to prevent freezing, but the average operator has no way of determining just what percentage of alcohol is in the radiator. With my improved device, he can quickly find out just what percentage of alcohol the water contains, and know just the freezing point, so that he can change the proportion if it is necessary or desirable.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved device. Fig. 2 is a view in elevation at right angles to Fig. 1. Fig. 3 is a view in vertical section showing the device filled with liquid under test. Fig. 4 is a view in transverse section on the line 4—4 of Fig. 3, and Fig. 5 illustrates the several balls in section.

1 represents a tubular receptacle, preferably of glass, strengthened by a slotted metal casing 2, having a base 3 at its lower end, and a removable screw-threaded cap 4 at its upper end. In the casing 1, I locate a plurality of floats 5. These floats are preferably spherical in form, and while I am not limited to the particular material, I may make them of glass and hollow, as shown in Fig. 5. The balls, while of the same external diameter, have walls of different thicknesses, so that they are of different weights. The "floats" as I shall hereinafter term them, are differently colored. For instance, one of the balls is blue, another yellow, another green, and the fourth red, but of course, the invention is not limited to the particular means for identifying the balls.

In operation, the liquid to be measured is poured into the receptacle 1, and in accordance with the specific gravity of the fluid, the floats will determine. If the red ball sinks to the bottom of the tube, it indicates that the fluid contains a certain percentage of alcohol. If the green ball sinks to the bottom, it will indicate a higher percentage and so on.

While the particular material is not essential, I have indicated on Fig. 2 a comprehensive scale which may be employed which is as follows: Red 8%; green 18%; yellow 28%; and blue 38%. If all four of the balls float at the top, it indicates that the liquid contains less than eight per cent. of alcohol. If it contains a higher content of alcohol, the red ball will sink to the bottom of the casing. If it contains eighteen per cent. or more, the green ball will sink to the bottom as well as the red, and the yellow and blue balls will sink to the bottom if the content of alcohol is sufficient to compel them to do so.

It is a well known fact that the higher the content of alcohol, the lower degree of temperature necessary to freeze the liquid, and hence by means of my improved device, it can be determined whether or not the liquid in the radiator has a sufficient percentage of alcohol to prevent freezing in a known temperature.

I would have it understood that my invention is not limited to the particular manner of designating the balls, nor to the particular material employed, nor to the particular construction of the balls of floats to vary their weight or specific gravity, and I do not limit myself to the precise details of construction set forth, but consider myself at liberty to make such changes and alterations as fairly fall within the spirit and scope of the appended claims.

Having thus described my invention, what I claim as new and desire to secure by Letters Patent is:

1. A device of the character described, comprising a casing of the same internal diameter throughout its length, and a plurality of floats in the casing of different specific gravity, said floats of successively increasing specific gravity from the topmost one downward, all of said floats of a diameter greater than one half the internal diameter of the casing, substantially as described.

2. A device of the character described, comprising a cylindrical casing of the same internal diameter throughout its length; and a plurality of differently marked balls arranged in a series, said balls of succesively increasing specific gravity from the topmost one downward, and all of said balls of the same diameter and greater in diameter than one half the internal diameter of the casing, substantially as described.

In testimony whereof I have signed my name to this specification in the presence of two subscribing witnesses.

DOWLING BENJAMIN.

Witnesses:
B. FRANK BIBIGHAUS,
S. MARION BIBIGHAUS.

Copies of this patent may be obtained for five cents each, by addressing the "Commissioner of Patents, Washington, D. C."